United States Patent
Kreiner et al.

(10) Patent No.: US 10,621,515 B2
(45) Date of Patent: Apr. 14, 2020

(54) OPTIMIZED TRAFFIC MANAGEMENT VIA AN ELECTRONIC DRIVING PASS

(71) Applicant: AT&T Intellectual Property I, L.P., Atlanta, GA (US)

(72) Inventors: Barrett M. Kreiner, Woodstock, GA (US); Jonathan L. Reeves, Roswell, GA (US); Ryan Schaub, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 363 days.

(21) Appl. No.: 15/198,943

(22) Filed: Jun. 30, 2016

(65) Prior Publication Data

US 2018/0005337 A1 Jan. 4, 2018

(51) Int. Cl.
*G06Q 10/02* (2012.01)
*G06Q 50/30* (2012.01)
*H04W 4/029* (2018.01)

(52) U.S. Cl.
CPC ............ *G06Q 10/02* (2013.01); *G06Q 50/30* (2013.01); *H04W 4/029* (2018.02); *G06Q 2240/00* (2013.01)

(58) Field of Classification Search
CPC .... G06Q 50/30; G06Q 2240/00; G06Q 10/02; H04W 4/02
USPC .......................................................... 705/13
See application file for complete search history.

(56) References Cited

U.S. PATENT DOCUMENTS

| | | | |
|---|---|---|---|
| 7,920,960 B2 | 4/2011 | Liu et al. | |
| 8,494,759 B2 | 7/2013 | Hada | |
| 8,494,991 B2 | 7/2013 | Stehle et al. | |
| 8,548,736 B2 | 10/2013 | Chan | |
| 8,606,517 B1 | 12/2013 | Ehrlacher et al. | |
| 8,855,901 B2 | 10/2014 | Leader et al. | |
| 9,105,185 B2 | 8/2015 | Joglekar | |
| 2011/0301985 A1* | 12/2011 | Camp | G06Q 10/02 705/5 |
| 2012/0041675 A1* | 2/2012 | Juliver | G06Q 10/08 701/465 |
| 2014/0172521 A1 | 6/2014 | Itaya et al. | |
| 2014/0172727 A1* | 6/2014 | Abhyanker | G06Q 50/30 705/307 |
| 2014/1222321 | 8/2014 | Petty et al. | |
| 2014/0279723 A1 | 9/2014 | McGavran et al. | |
| 2015/0088618 A1 | 3/2015 | Basir et al. | |
| 2015/0161564 A1* | 6/2015 | Sweeney | G06Q 10/063114 705/338 |

(Continued)

OTHER PUBLICATIONS

Nasdaq.com, "What is a hardship license", available at: https://www.nasdaq.conn/articles/what-is-a-hardship-license-2013-06-04, Last visited Dec. 2, 2019, published Jun. 4, 2013 (Year: 2013).*

(Continued)

*Primary Examiner* — Kevin H Flynn
*Assistant Examiner* — Emmett K. Walsh
(74) *Attorney, Agent, or Firm* — BakerHostetler

(57) ABSTRACT

A method includes receiving a request for a transportation reservation, allocating at least one resource to accommodate the reservation, monitoring a location of a mobile device associated with the reservation, releasing the at least one resource when the location of the mobile device indicates the at least one resource is no longer needed wherein the mobile device is associated with a subscriber.

20 Claims, 13 Drawing Sheets

(56) References Cited

U.S. PATENT DOCUMENTS

| | | | |
|---|---|---|---|
| 2015/0228188 A1 | 8/2015 | MacFarlane et al. | |
| 2015/0321641 A1* | 11/2015 | Abou Mahmoud | ........................ B60R 25/2018 701/2 |
| 2016/0027079 A1* | 1/2016 | Schoeffler | .......... G06Q 30/0609 705/325 |
| 2016/0076905 A1 | 3/2016 | Broadbent et al. | |
| 2016/0125736 A1* | 5/2016 | Shaik | ....................... G08G 1/14 701/23 |
| 2016/0203576 A1* | 7/2016 | Novak | ............... G01C 21/3438 705/26.7 |
| 2016/0332535 A1* | 11/2016 | Bradley | ................. B60N 2/002 |

OTHER PUBLICATIONS

Calafate et al.; "Traffic Management as a Service: The Traffic Flow Pattern Classification Problem"; Mathematical Problems in Engineering; 2015; 14 pages.

* cited by examiner

OPTIMIZED TRAFFIC MANAGEMENT VIA AN ELECTRONIC DRIVING PASS

TECHNICAL FIELD

The technical field generally relates to active traffic management and more specifically to optimizing traffic management using electronic driving passes communicating through a cellular network.

BACKGROUND

Ultra-high density metropolitan area infrastructure can no longer effectively handle personal or group automotive transportation. Often in metro areas, transit times are increasing, as is the associated pollution from motor vehicles. The time spent in transit decreases the productivity of commuters.

To combat traffic, commuters and casual drivers will adopt travel routes based on personal knowledge and apps such as Google Maps® and Wayz®. While those apps may cut transit time somewhat by routing traffic around certain trouble spots, they don't solve the problem. An ill-timed accident or a special event such as a Presidential motorcade may render a public thoroughfare unusable for hours. The problem is exacerbated for emergency responders trying to navigate over-taxed infrastructure, putting health, safety and even lives at risks. Finally, weather, both predicted and unexpected, can also rapidly impact infrastructure capacity in a negative way.

SUMMARY

The following presents a simplified summary that describes some aspects example of the subject disclosure. This summary is not an extensive overview of the disclosure. Indeed, additional or alternative aspects and/or examples of the subject disclosure may be available beyond those described in the summary. There is disclosed a method for managing access to a transportation infrastructure including Receiving a request from a mobile device for a transportation reservation, allocating at least one resource to accommodate the reservation; monitoring a location of a mobile device associated with a user requesting the reservation as the user uses the at least one resource; and releasing the at least one resource when the location of the mobile device indicates the at least one resource is no longer needed. The mobile device may be associated with a subscriber. The method may further include having a plurality of resources and the allocating step allocates at least one of the plurality of resources. As an alternative, the at least one resource is requested by the user and an alternative resource is suggested. The alternative resource may then be accepted and the reservation updated to include the alternative resource. The reservation may be modified to include at least one new resource based on receiving an external input wherein the external input is related to one of an event, another transportation schedule, and the unavailability of the at least one resource. The method may further comprise generating a list of route options wherein one of the route options is a premium route option and the system receives an acceptance of the premium route and then assesses a charge for the premium route. As an alternative, the method may include assessing a penalty for deviation from use of the at least one resource.

The disclosure also relates to an infrastructure management server having a processor, and a memory coupled with the processor, the memory having stored thereon executable instructions that when executed by the processor cause the processor to effectuate operations that implement the method steps described above.

BRIEF DESCRIPTION OF THE DRAWINGS

The following detailed description is better understood when read in conjunction with the appended drawings. For the purposes of illustration, exemplary examples are shown in the drawings; however, the subject matter is not limited to the specific elements and instrumentalities disclosed. In the drawings.

DETAILED DESCRIPTION

As discussed herein, this disclosure is directed to an Electronic Travel Pass (ETP) which forms part of a mobile infrastructure management system. The ETP may be a token that permits access to a portion or all of an infrastructure. The system may include a plurality of mobile devices and a sophisticated server having a predictive engine which is able to effectively navigate a stressed infrastructure. Specifically, the elements of the system, include mobile phone tracking, current traffic conditions, prior event scheduling, historical traffic patterns/issues, along with new elements, such as the ability to track non-enabled vehicles (intruders), stationary vehicles (parked cars) and other physical impediments (obstacles, pedestrians), driver accident history, destination area vehicle parking capacity, vehicle size and handling capabilities, and itinerary based scheduling The infrastructure may also have interfaces to other commercial transportation management systems, include busses, trains and airports.

Figure 1:
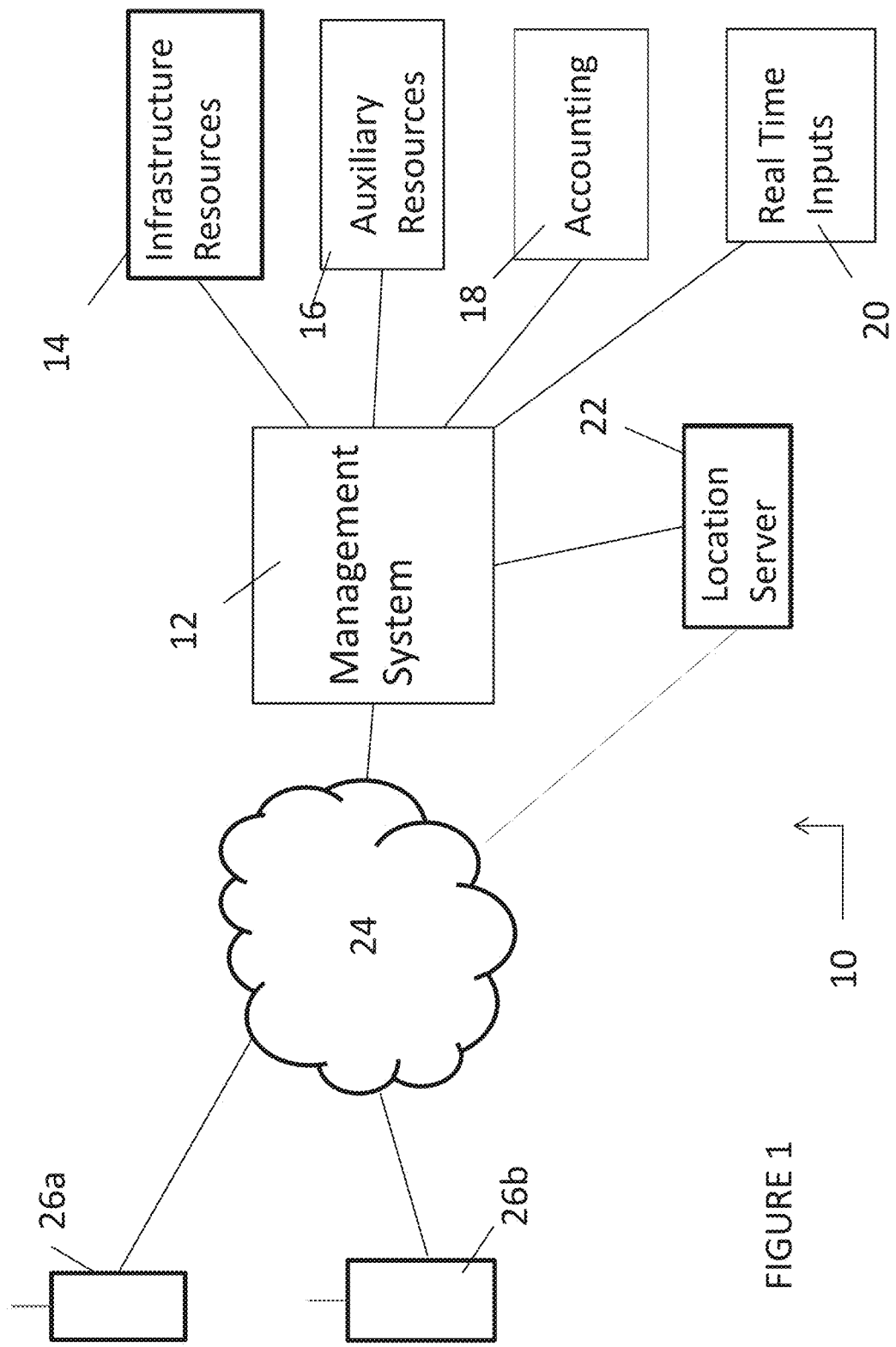
FIG. 1 illustrates an exemplary high level architecture of the present disclosure.

With reference to FIG. 1, there is shown a high level overview of the present disclosure. There is shown a system 10 having a network 24 which interconnects a plurality of mobile devices 26a, 26b to a management system 12. It should be noted that mobile devices 26a, 26b are exemplary only and user may communicate with the management system 12 using a computer, a land-line telephone, a tablet, or any other type of user terminal. The network 24 may be any type of cellular network, including but not limited to 3G, 3GPP, 4G/LTE or any other cellular networks in existence or to be developed in the future. The network 24 may also include WiFi, WiMax, or LAN interfaces and may also include interfaces to the Public Switched Telephone Network (PSTN). When implemented as part of a cellular network, the management system 12 may take advantage of other features of the cellular network described in more detail below with respect to FIGS. 6 through 13, but which may, for example, include provisioning systems, location servers, SMS and MMS systems, emergency alerts, and the like.

There is shown a management system 12—described in more detail below—in communication with the mobile devices 26a, 26b through network 24. The management system may also interface with other parts of a cellular infrastructure, including a location server 22 and other elements described in connection with FIGS. 5-12 below. There is also an infrastructure resources function 14 which may include various roads, bridges, tollways, parking structures, and other components that make up a transportation infrastructure. Auxiliary resources 24 may include transportation resources managed external to the management system 12 but nonetheless are in communication with the management system 12. Examples of the auxiliary resources 24 may include train routes and schedules, airline reservations systems and air traffic control systems, bicycle and walking paths, and any other transportation resource.

The management system may also include an accounting function 18 which may, for example, allocate a fee to users for access to certain scarce transportation resources. Finally, the management system 12 may receive real time inputs 20 from a variety of sources, including, but not limited to weather reports, driver information, event status, or any other real time or near real time input that may affect the transportation infrastructure.

Figure 2:
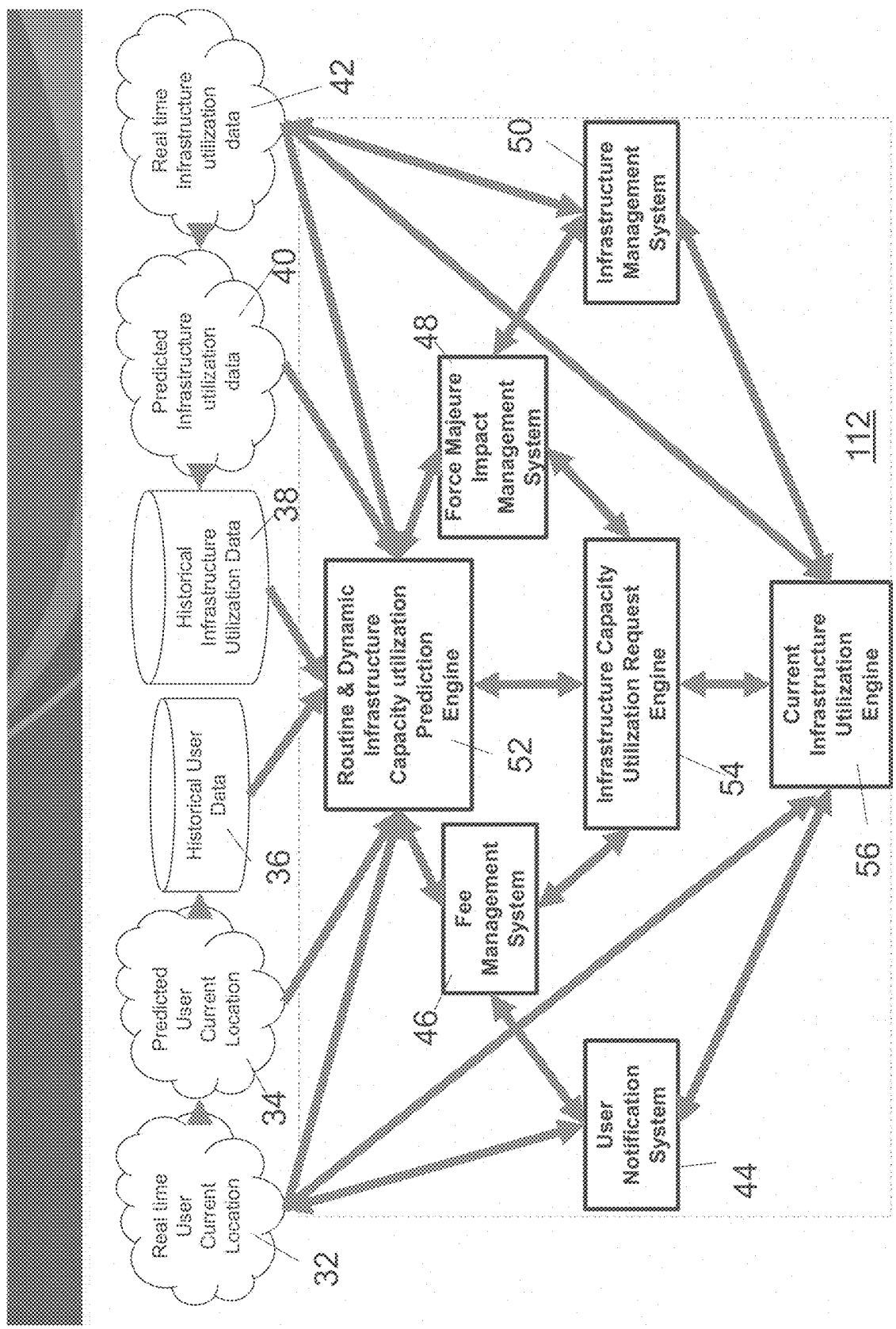
FIG. 2 illustrates an exemplary architecture of a management system of the present disclosure.

As shown in FIG. 2, real time inputs 12 may also include real time user current location data 32, which may, for example, come from location server 22 or from a mobile device 26a, 26b directly. Real time inputs 12 may also and real time infrastructure utilization data 42 which may, for example, include, but is not limited to, traffic conditions, as a function of capacity or travel times between two points of the infrastructure.

Continuing with FIG. 2, there is shown an exemplary functional block diagram of a management system 112 in accordance with the present disclosure. The management system 112 may include a current infrastructure utilization function 56 (hereinafter referred to as current utilization 56), an infrastructure capacity utilization request engine 54 (hereinafter referred to as utilization request 54), a routine and dynamic infrastructure capacity utilization prediction engine 52 (hereinafter referred to as capacity prediction engine 52), a fee management system 46, a user notification system 44 and force majeure impact management system 48 (hereinafter referred to as a force majeure system 48) and an infrastructure management system 50. The management system 112 may have two databases, an historical user database 36 which is populated with real time user current location data 32 and predicted user current location data 34 and an historical infrastructure utilization database 38 which is populated with real time infrastructure utilization data 42 and predicted infrastructure utilization data 40.

Continuing with the description of FIG. 2, there is shown a series of interconnections among the various functions, databases and inputs. These are exemplary only and not intended to be limiting. For example, the current utilization 56 is shown having inputs from the real time user current location 32 and the real time infrastructure utilization 42 as well as being in two way communication with the user notification system 44, utilization request 54 and the infrastructure management system 50. With this set of communications, the current utilization engine 56 knows the relevant infrastructure utilization and can apply that knowledge to a user requesting an allocation of infrastructure resources.

Also by way of example is the utilization request 54 which is shown with two way communications to the utilization engine 56 as described above, as well as the capacity prediction engine 52, the fee management system 46 and the force majeure system 48. These inputs permit the utilization engine to 54 allocate resources as a result of a user request knowing the current state of utilization of resources and whether those resources are scarce so as to offer them to a user at a fee. The utilization engine 56 also serves as a user reservation system, including source and destination specification, arrival or transit time travel goals, with recurring, dynamic, and priority systems input to provide the most cost-effective and efficient vehicle routing and infrastructure usage.

The prediction engine 52 is shown with multiple inputs and interfaces, again as a non-limiting example, which permit the prediction engine to know what additional traffic the infrastructure is able to absorb at any time. This predictive engine 52 may analyze potential traffic patterns and can adjust for new and unexpected behaviors.

The fee management system 46 is also shown with multiple exemplary communication interfaces. The fee management system 46 may allocate costs for scarce infrastructure resources. The costs may be fixed such as access to a toll road or may be variable based on current demand, time of day, type of vehicle, or any number of factors. The fee management system 46 may also function to allocate debit and credit value to a user. The fee management system 46 may also suggest alternatives to the user through the user notification system 44 such that the user may have a choice with respect to convenience, time of travel and cost, for example.

The force majeure system 48 also shown with multiple exemplary communications interfaces may, for example provide decisions with respect to extraordinary events such as weather (i.e., rain, snow, flooding, etc.), a traffic accident, a parade route on a particular day, and any other type of extraordinary event that affects the infrastructure.

Finally, the user notification system 44 provides a user interface to the exemplary management system 112. A mechanism, which may, for example, be implemented as a mobile device application or implemented in mobile device hardware or firmware, to track a vehicle as it progresses through a managed area, can be used to request deviations, alert driver to route changes.

Figure 3:
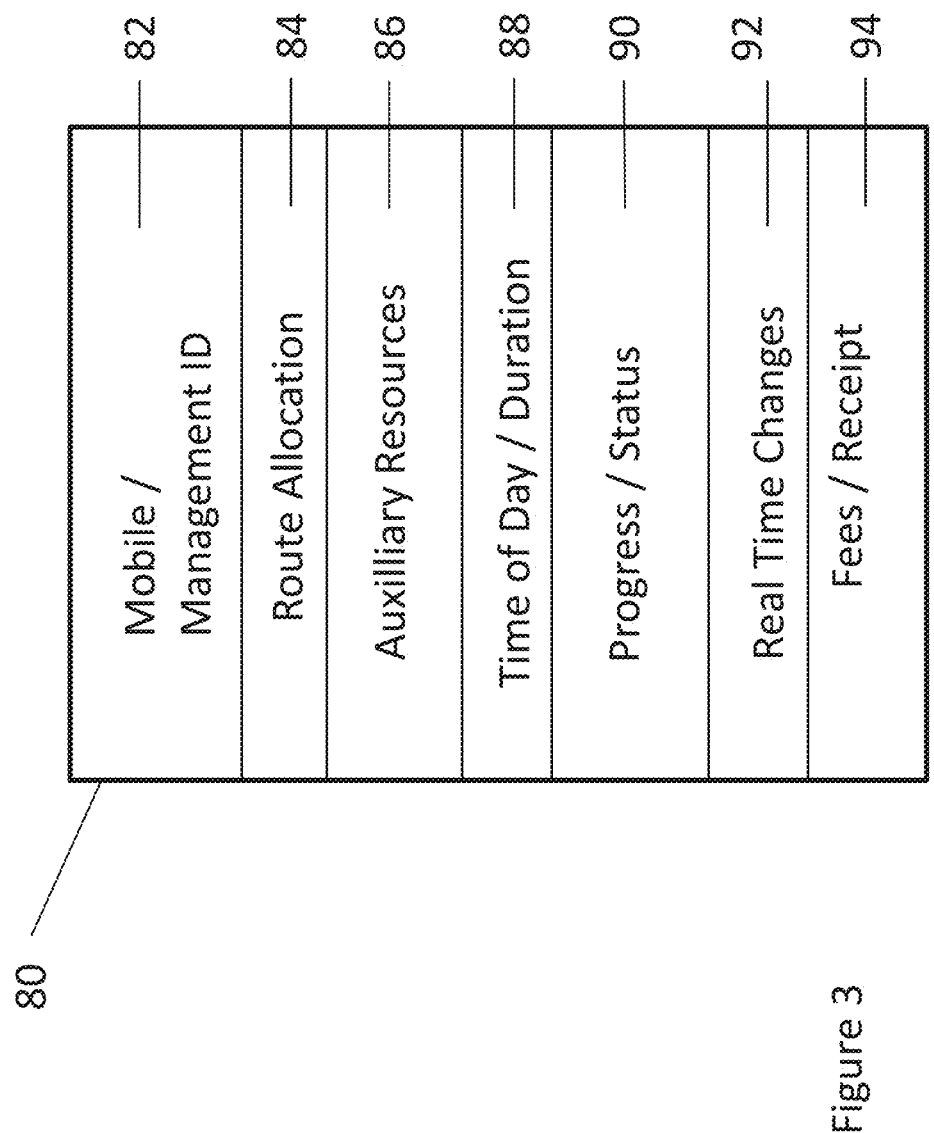
FIG. 3 illustrates an exemplary electronic travel pass in accordance with the present disclosure

With reference to FIG. 3, an ETP 80 may be issued from the user notification system 44 at the initial request for access to infrastructure and updated during the course of travel. The ETP 80 may, for example be sent from the user notification system 44 and stored on a handset 26a, 26b and provide real time or near real time updates to a display or other outputs on the handset 26a, 26b. For example, there may be a header 82 providing the addressing for communications between the handset 26a, 26b and the management system 112. The initial route allocation/reservations may be stored at 84. Auxiliary resources, if any, may be stored at 86. The allocated time of day and anticipated duration of travel may be stored at 88. Progress and/or status of the planned trip may be stored at 90. Real time changes to routes or times, if any, may be stored at 92. The download of any such changes may also be accompanied by an audio or visual alert followed by the details of the change, either provided by audio, video or text. Finally, fees associated with the ETP 80 and any receipts may be stored at 94. The fees may include usage fees, toll fees, parking fees, or any type of fees to be accessed against the user on a particular trip or group of trips. The ETP 80 may be recurring, for example, such that a user's commute to work can be automated. The ETP 80 may be customized based on the type of travel or based on the user or any other customization criteria. The ETP 80 may also include status from other travel or infrastructure management systems, for example, an airport system, a ferry schedule or a bus/train transit system, to allow a user to track progress in view of another transit schedule. The ETP 80 may also include parking information at the destination or a waypoint. It will be understood that the ETP 80 shown is only exemplary and may include more or less communication fields.

In addition to infrastructure resources, a personal concierge may be included such that a user may request sports, theatre or other event tickets, dinner reservations, hotel reservations, or the like at the same time or as part of the same transaction as requesting/reserving transit resources. It will be understood that the system 112 may be integrated with connected car and/or autonomous car systems.

Figure 4:
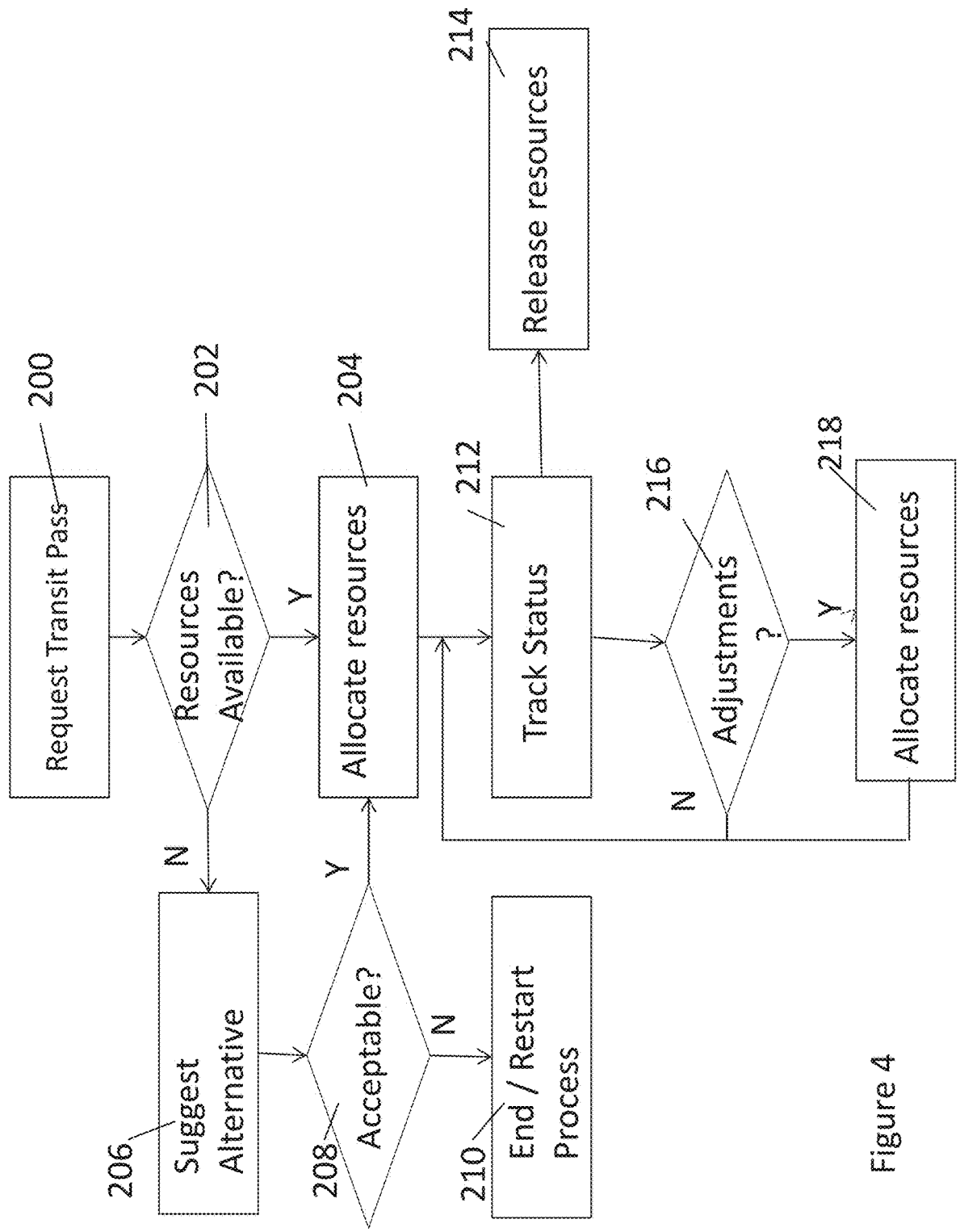
FIG. 4 illustrates an exemplary process flow in accordance with the present disclosure.

There are a variety of ways that the management system may be used. With reference to FIG. 4, there is shown an example of such use. At 200, a transit pass may requested by a user. The request may include, but is not limited to, a starting point and destination, a time of day, and a preferred route or a route to be avoided (i.e. highways or neighborhoods). Although shown as a user request, the mobile transit pass request may be system generated based on a user's schedule of activities (i.e., attendance at a ball game or daily commute to work) or it may be requested by a third party (i.e., as a result of a wedding invitation in which the third party is handling either directions or the cost of transport or is otherwise involved in the). At 202, an inquiry is made to determine if the infrastructure resources required for the requested route are available. If not, alternatives are suggested at 206. The alternatives may, for example, include alternative routes, times, vehicles, or fees for such usage based on tolls, scarcity or any other factor. If the alternative is acceptable at 208 or if the original resources are available at 202, then the resources are allocated at 204. The allocated resources may then be communicated to the user through an ETP 80 or other interface. If the alternative is not acceptable, the process ends or restarts at 210.

Assuming the user accepts the route and any fees associated with the resources used for such route, the status is tracked at 212. The status includes not only vehicle process, but also the status of the infrastructure and any external influences on the infrastructure. If the resources include interfaces to other managed resources such as an airline system or concierge function, then that status may also be tracked and communicated to the user. As resources are used, they are released at 214.

As mentioned earlier, there may be real time inputs affecting the availability of the transportation resources. At 216 (and throughout the process), adjustments to the resources may be requested, either proactively by the user or reactively based on real time inputs to the management system 112. If not, then the status continues to be tracked at 212. If so, then new resources are allocated based on the adjustments at 218 and the status is tracked at 212 based on the newly adjusted resources.

The management system 112 may impose penalties for failing to follow re-routing or creating a situation where others are prevented from using the infrastructure (i.e., causing an accident or aggressive driving). The historical user data stored in database 36 may be used to assess threats to the system's operation or efficiency. For example the historical user database 36 may include history of the vehicle which, depending on vehicle condition or repair history, may be identified as a risk and potential threat assessment. Based on that threat assessment, the vehicle may be assessed penalty, the travel bubble may be adjusted, travel route may be altered, infrastructure may be altered, or other steps taken to modify traffic pattern.

Figure 5:
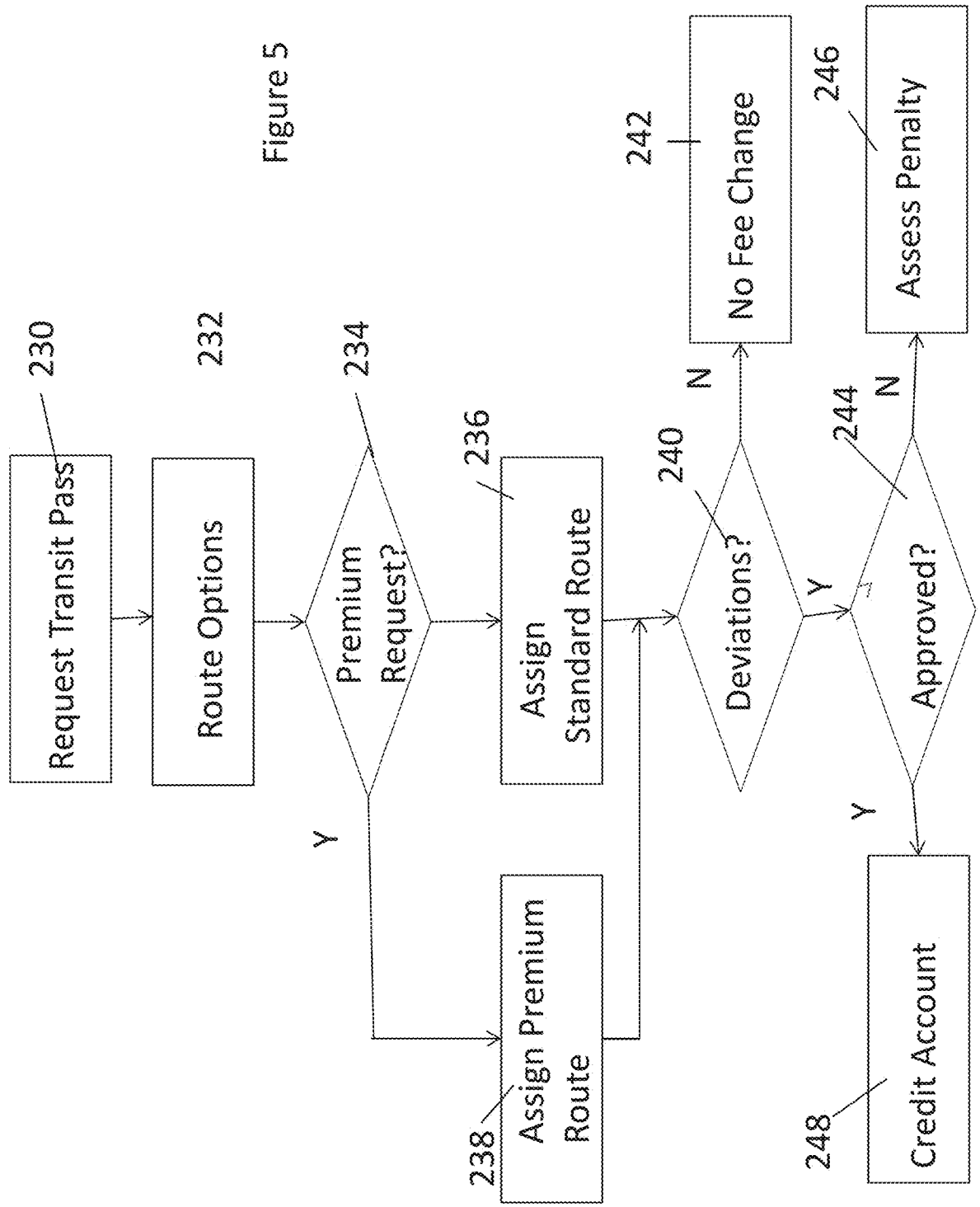
FIG. 5 illustrates another exemplary process flow relating to fees in accordance with the present disclosure.

FIG. 5 illustrates as example process as to how a fee structure may be implemented in allocating scarce resources. At 230, the requests transit pass from the originating point to the destination point. At 232, the management system 112 responds with route options and estimated arrival time for each. At 234, the user is given the option to select a standard route at low cost or no cost or a premium route with an associated fee and perhaps either an earlier arrival time, more scenic route, better driving conditions, or any other factor that may be considered a premium route. If the user selects the standard route, then the management system 112 will assign the standard route at 236. If the user selects the premium route, then the management system 112 will assign the premium route at 238. In either case, the management system 112 will track departure and progression along route, including speed and travel conditions as set forth above, and release resources once the user has passed certain checkpoints. The management system will monitor for deviations from the assigned route at 240. If there are no deviations, then there will be no change in fees at 242. If there are either time or spatial deviations from the assigned route, an alert will be triggered to the user and the deviations have not been approved at 244, then the user will be requested to either return to the assigned route or possibly face a financial penalty. If the user fails to return to the route, a new route is calculated and fee assessed at 246. Depending on the conditions or capacity of the infrastructure or changes in the user's plans, either the user or the management system may suggest cheaper alternatives which if accepted by both the user and the management system 112, the deviation would be approved at 244 and the user's accounted credited at 248 as compensation for taking an alternate route based on infrastructure capacity or any other reason.

The deviations in the route described above may not necessarily relate to deviations in the route by the driver. For example, the management system 112 may alert the user that based on other utilization, there may be no parking capacity at destination and recommend either an alternate destination (i.e., a different stadium parking facility) or perhaps an alternate transit method (i.e., train/bus). The management system 112 may offer discounted access, priority access, or a fee credit to user for utilizing alternate transit in particularly heavy times or for forfeiting a previously scheduled reservation.

Public safety may be enhanced by the present disclosure. When an emergency is identified, the available response units and their travel path are identified and given priority access to infrastructure resources while other users may be diverted. The impact to existing infrastructure use and reservations may be calculated in real time or near real time using the management system 112 and the dispatcher's CAD, and impacted personal and infrastructure vehicles are notified and their routing is updated (on-demand notifications, delayed launch, speed adjustment, lane clearing, etc.

Travel in the ETP managed system may dramatically improve infrastructure utilization by micro managing the utilization of the infrastructure. Managing system throughput through scheduling and throttling of traffic will be achieved through the management system 112. Embodiments of the present disclosure has the potential to increase productivity, reduce pollution, lower repair costs, advantageously scheduling maintenance operations, and decreasing first responder response time. Special events travel, which may, for example, be a Presidential motorcade, can now be scheduled in rolling transport exclusion windows or "bubbles", as opposed to shutting down infrastructure for an extended period. Drivers utilizing the same infrastructure resources may be paced to avoid entering the bubble, and notified if they inadvertently enter the bubble. Failing to exit the bubble (when appropriate) may result in the special events security being alerted or financial penalties imposed. If the vehicle is a connected car, there may be an escalating control asserted. For example, a connected car may be given parameters such as high/low speed limiters or the movement of other vehicles to effectively block the wayward vehicle from continuing within the bubble.

There may also be special treatment for service vehicles. For example, cabs, Uber/Lyft service, and other point to point personal transit solutions could have significant impact on resources and scheduling. The management system 112 may be used to provide the appropriate incentives/disincentives for use of the services as the case may be. For example, single user cabs may have lower priority, but shared rides may be given higher priority. The management system may be in communication with a dispatch system to coordinate the scheduling and efficient use of resources. Delivery services (USPS, FedEx, UPS etc.) may submit their routes into the management system in advance to proactively manage any disruption to the infrastructure or any delivery delays which otherwise may occur. Other impeding services such as moving trucks which require more stationary time may also be efficiently scheduled and the impact on infrastructure considered in providing routing to other users. Time constrained delivery (concrete, live delivery, etc) can gain escalating priority as their viability window closes. Bridge openings over waterways may be accommodated.

It will be understood that many other process flows are possible in accordance with the present disclosure. For example, rather than a route request, a user may choose to enter only an event such as a flight time or a sporting event and let the management system 112 choose the departure time and preferred route and even the mode of travel. In addition to receiving real time feedback from the infrastructure monitoring functions, the management system 112 may receive updates and feedback from a user. For example, users may have the ability to report unforeseen and otherwise undetected issues affecting the infrastructure. Users may request route updates or alterations through their mobile devices 26a, 26b. Additional apps running on mobile devices 26a, 26b may also provide input to or receive output from the management system 112. For example, an app that monitors a user's health may communicate with the management system 112 to schedule resources for a trip to a doctor's office or an emergency facility. A sports app may initiate a request for resources to a sporting event without further user intervention.

Extraneous reporting systems may also feed into the management system 112. For example, if a sporting event is rained out, the management system 112 may be notified which in turn would notify users and either automatically or upon request of the users release resources and receive a refund that had previously been scheduled for transportation to the event. A flight cancellation at an airport may trigger the same type of reaction through the management system 112. If the venue/event is cancelled, or the travel situation alters significantly enough that the traveler cannot arrive at or near the appropriate time, then a cascade may be generated to remove/alter the reservation or travel plans, provide a refund, or suggest alternatives. Conversely, if, during venue/event scheduling, there is no route possible that can deliver the traveler(s) to the venue/event at or near the appropriate time, the system should avoid or prevent the reservation from taking place. If the venue/event reservation is malleable, then an evaluation of possible alternatives to the original reservation, including earlier, later, or even another day, should be presented to the user. If transit has started when the viability window has closed, then return or alternate routes may be calculated.

For parking/venue access, the management system 112 may take into account the mobility of the travelers (via their profile) and any foot travel path, thereby accommodating elderly or disabled travelers travel time and access needs, which is the intent of Americans with Disabilities Act ("ADA"). When the number of mobility-limited travelers requiring special access is known, the capacity for their needs may be set accordingly to ensure adequate accommodation and the most effective use of the available space. If there is an excess of mobility-limited travelers, then the capacity may be increased and the parking positions prioritized by level of mobility. The use of a space by a mobility-unlimited traveler that is reserved for mobility-limited travelers at the time of parking would also generate an automatic alert and/or financial penalty. An offer to relocate the vehicle that was in a space that was not reserved for mobility-limited travelers for a refund may also be offered, but the movement would not be required as the system instructed the traveler to use the space originally. Reduced mobility may also be accounted for in transportation system interfaces, based on historical transition times, leading to more effective utilization by those travelers, and reduced travel stress on them and their travelling companions.

The management system 112 may also be used to enforce travel restrictions on a user by preventing or limiting access to the infrastructure. For example, a restricted set of destinations, transit modes, travel paths, or travel times may be applied to a user based on their personal preference profile, but also external profiles they may not have control over. The restricted set of destinations may include public locations, such as hospitals, police stations, fire departments, courthouses, DMV, and private locations could include personal doctor(s), lawyer, "school", "work", and "home". The restricted set of destinations may be filtered further based on time of day or events/appointments at those destinations. If the use has parking tickets or fines imposed on them, instead of booting a car, and thereby forcing the vehicle to impact the infrastructure, the user's travel destinations may be limited to home or the location where the parking tickets may be paid. If the user is under a legal binding, such as house arrest, they may be restricted to specific public and private locations. The loss of driving privileges may be enforced by not allocating an ETP be issued for a user. International or out of state travel restrictions may exclude certain modes of transportation (airplane, train) from travelling routes. Other legal bindings against contact with specific individuals or locations (restraining orders) may exclude certain static or dynamic travel paths. In the dynamic case, avoiding contact may involve time shifting the user.

Travel times may be restricted by, for example, a personal or public curfew. Individual and group "Student" drivers may also have restrictions placed on their travel by the management system 112, parental controls, or a legal authority over them. If the user does deviate from the destination/path/mode/time, alerts are created to notify appropriate individuals/groups, and the vehicle itself, other vehicles, or the infrastructure can influence the traveler to either correct the deviation, or safely isolate the traveler.

The foregoing use cases are exemplary only and are not meant to be exhaustive for the implementation and use of the management system 112 in accordance with the disclosure.

Figure 6:
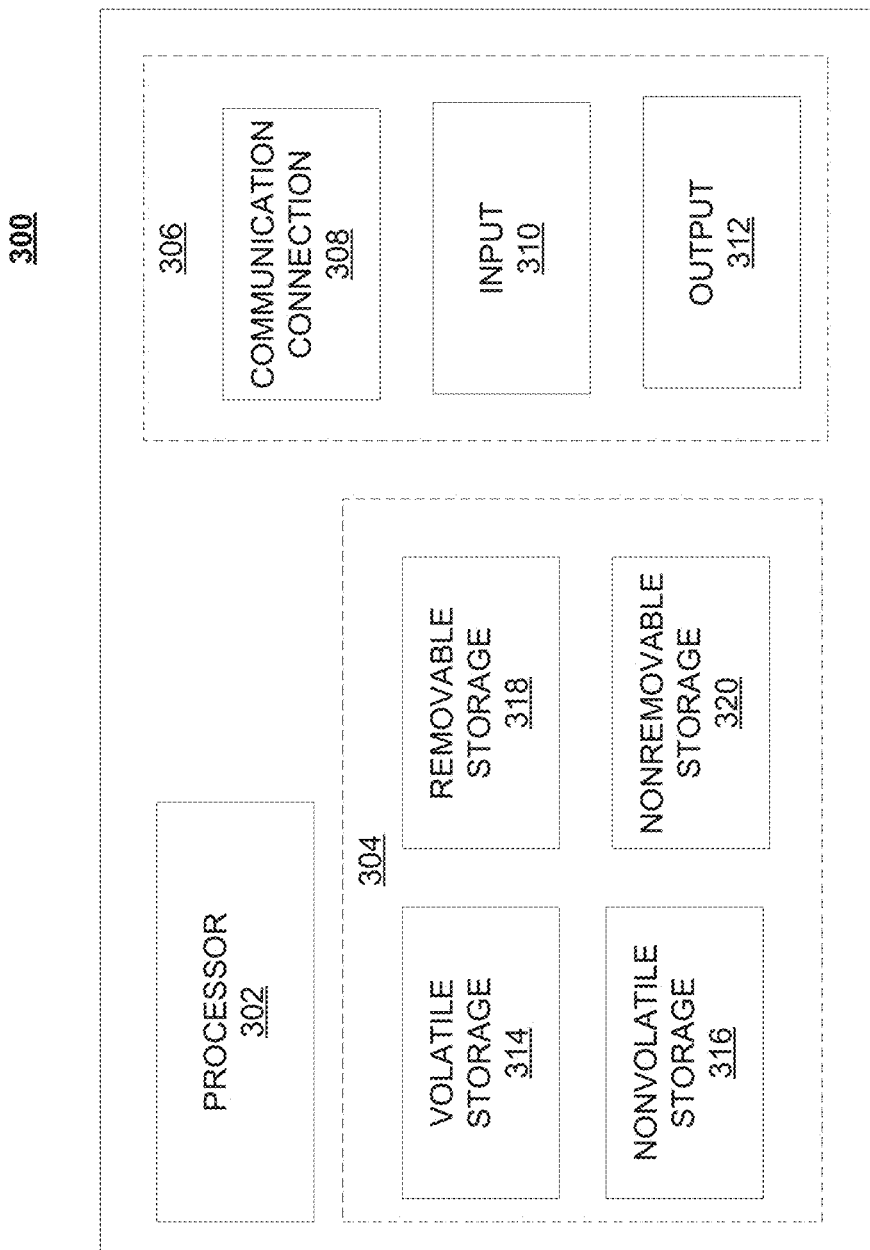
FIG. 6 is a schematic of an exemplary network device.

FIG. 6 is a block diagram of network device 300 that may be connected to or comprise a component of network 24. Network device 300 may comprise hardware or a combination of hardware and software. The functionality to facilitate telecommunications via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 6) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
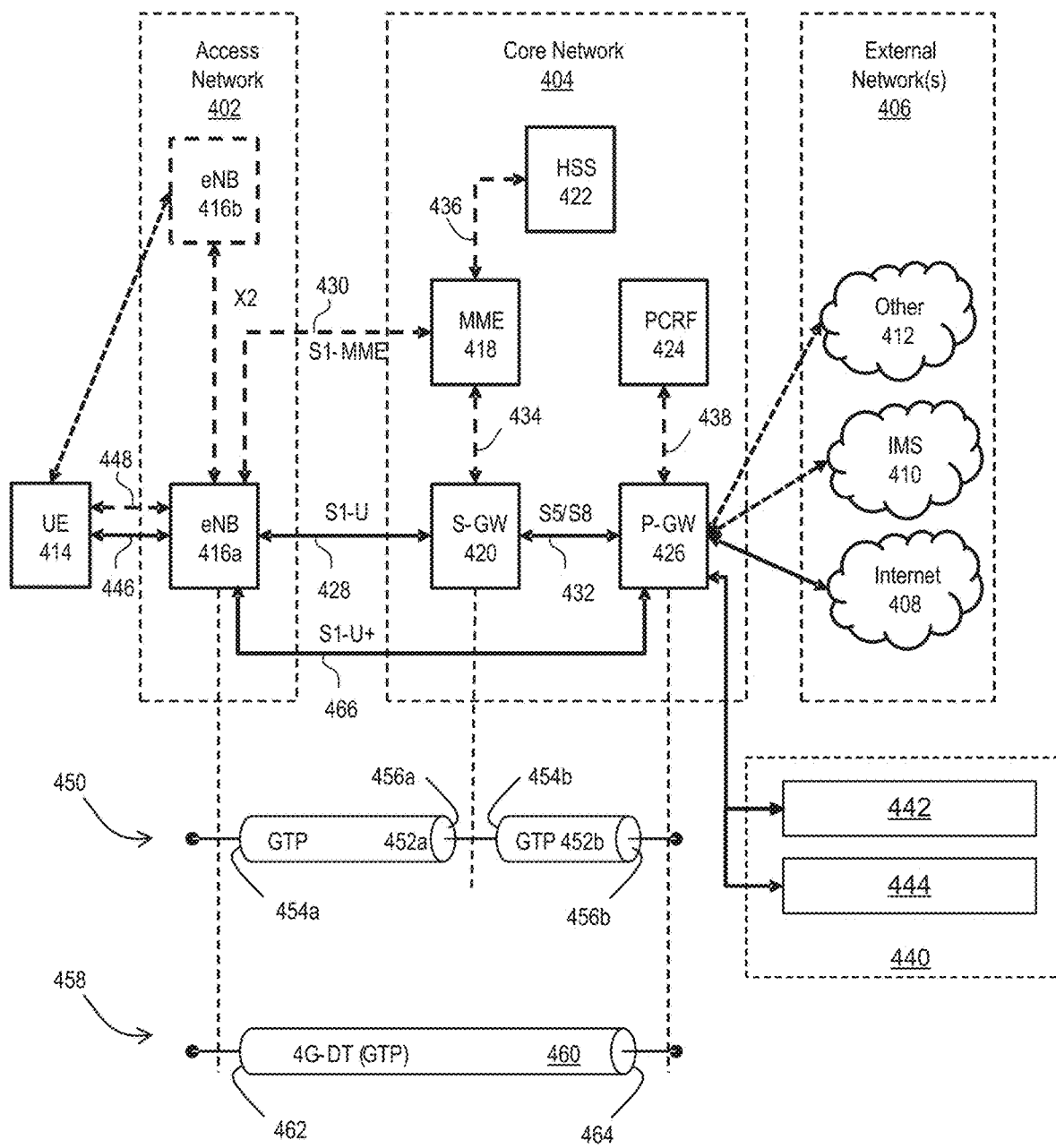
FIG. 7 depicts an exemplary communication system that provides wireless telecommunication services over wireless communication networks.

FIG. 7 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 7. In other words, either or both of access network 402 and the core network 404 can include additional network elements that are not shown, such as various routers, switches and controllers. In addition, although FIG. 7 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416*a*, a second portion (e.g., an S1 data bearer 428) between eNB 416*a* and SGW 420, and a third portion (e.g., an S5/S8 bearer 432) between SGW 420 and PGW 426. Various signaling bearer portions are also illustrated in FIG. 7. For example, a first signaling portion (e.g., a signaling radio bearer 448) between UE 414 and eNB 416*a*, and a second signaling portion (e.g., S1 signaling bearer 430) between eNB 416*a* and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452*a* between two tunnel endpoints 454*a* and 456*a*, and a second tunnel 452*b* between two tunnel endpoints 454*b* and 456*b*. In the illustrative example, first tunnel 452*a* is established between eNB 416*a* and SGW 420. Accordingly, first tunnel 452*a* includes a first tunnel endpoint 454*a* corresponding to an S1-U address of eNB 416*a* (referred to herein as the eNB S1-U address), and second tunnel endpoint 456*a* corresponding to an S1-U address of SGW 420 (referred to herein as the SGW S1-U address). Likewise, second tunnel 452*b* includes first tunnel endpoint 454*b* corresponding to an S5-U address of SGW 420 (referred to herein as the SGW S5-U address), and second tunnel endpoint 456*b* corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416*a* and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416*a* and PGW 426, by way of SGW 420. That is, SGW 420 can serve a relay function, by relaying packets between two tunnel endpoints 416*a*, 426. In other scenarios, direct tunneling solution 458 can forward user data packets between eNB 416*a* and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416*a*. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 8:
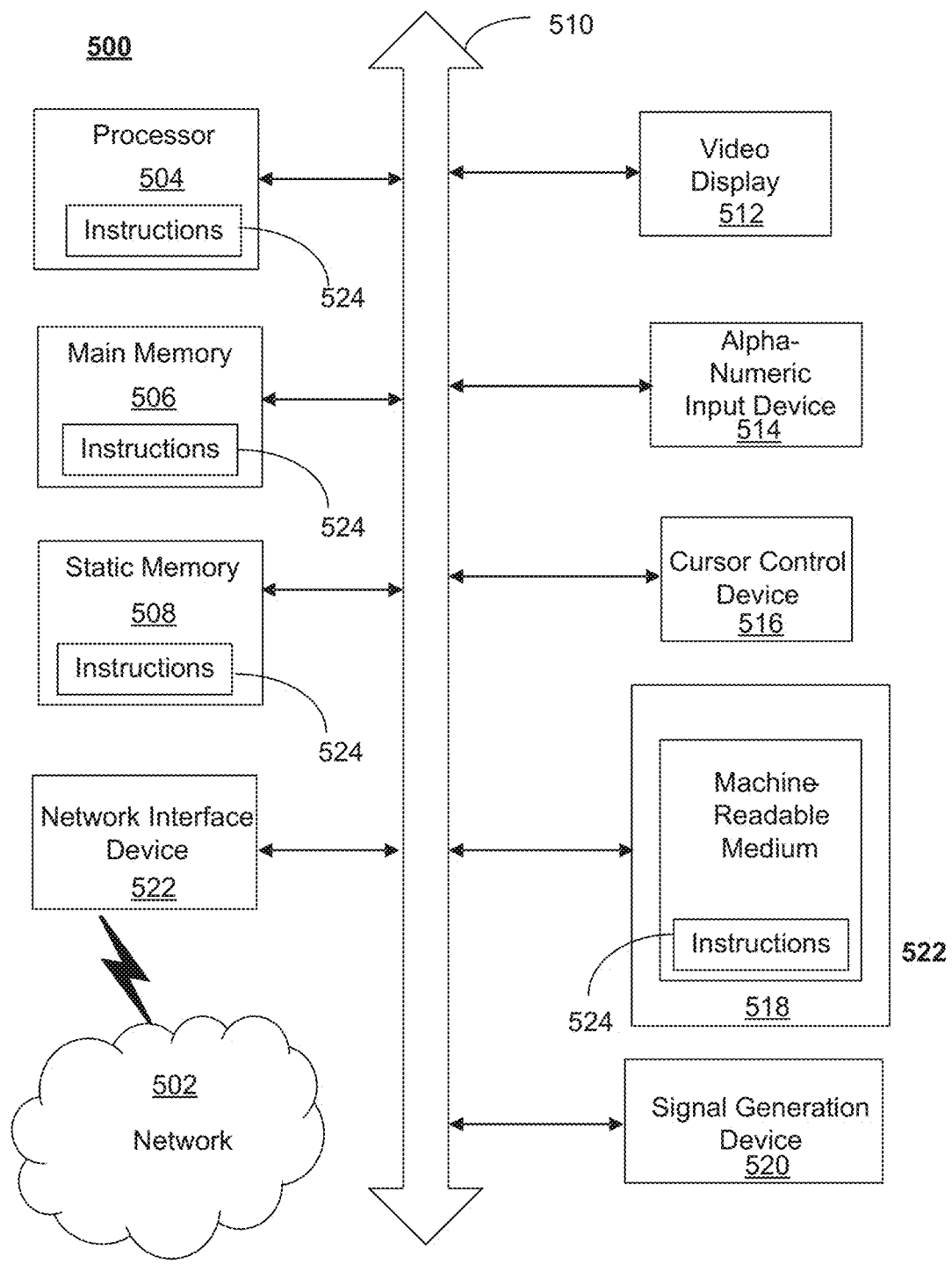
FIG. 8 depicts an exemplary communication system that provides wireless telecommunication services over wireless communication networks.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 9:
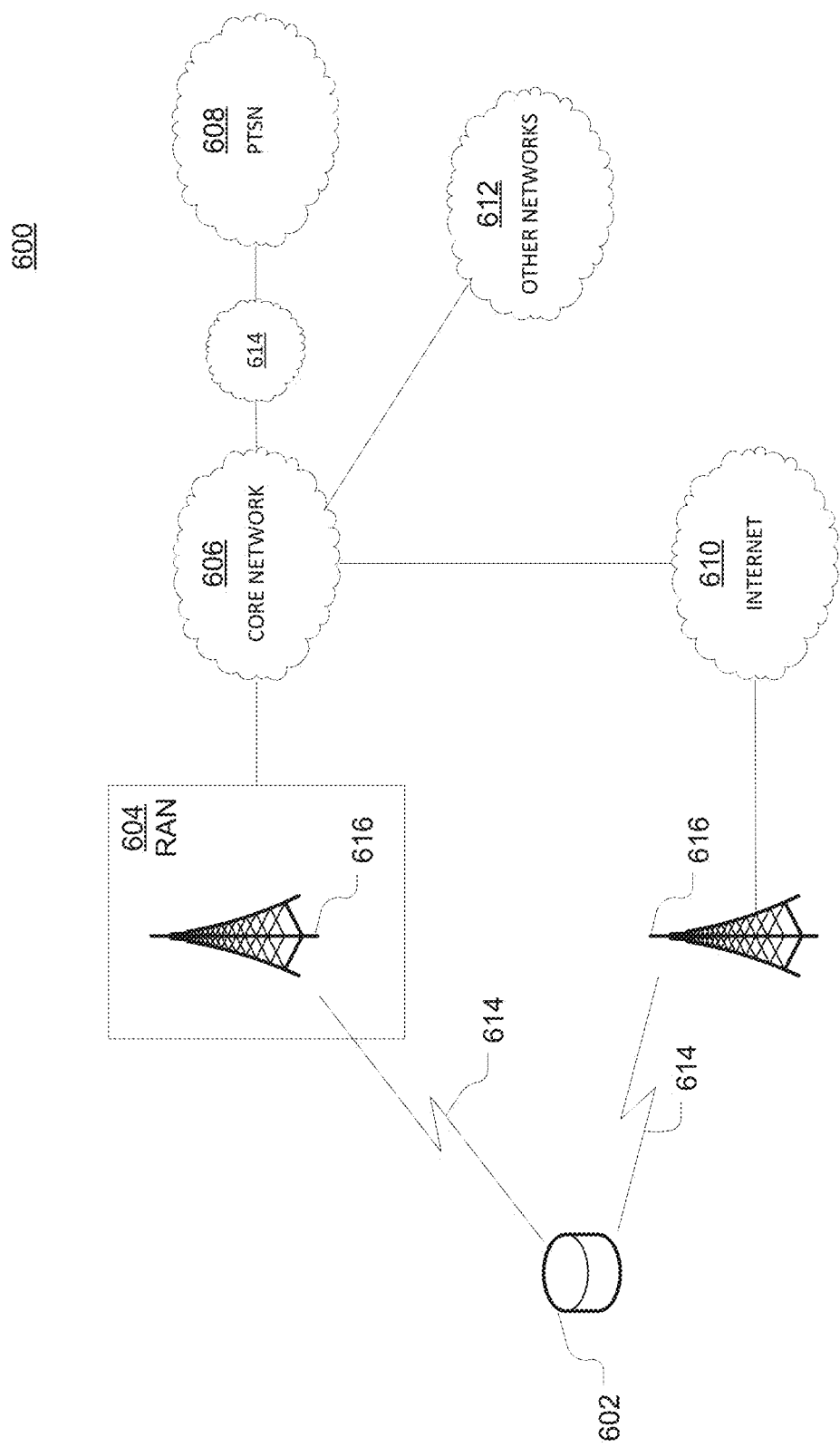
FIG. 9 is a diagram of an exemplary telecommunications system in which the disclosed methods and processes may be implemented.

As shown in FIG. 9, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 9, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 9, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 10:
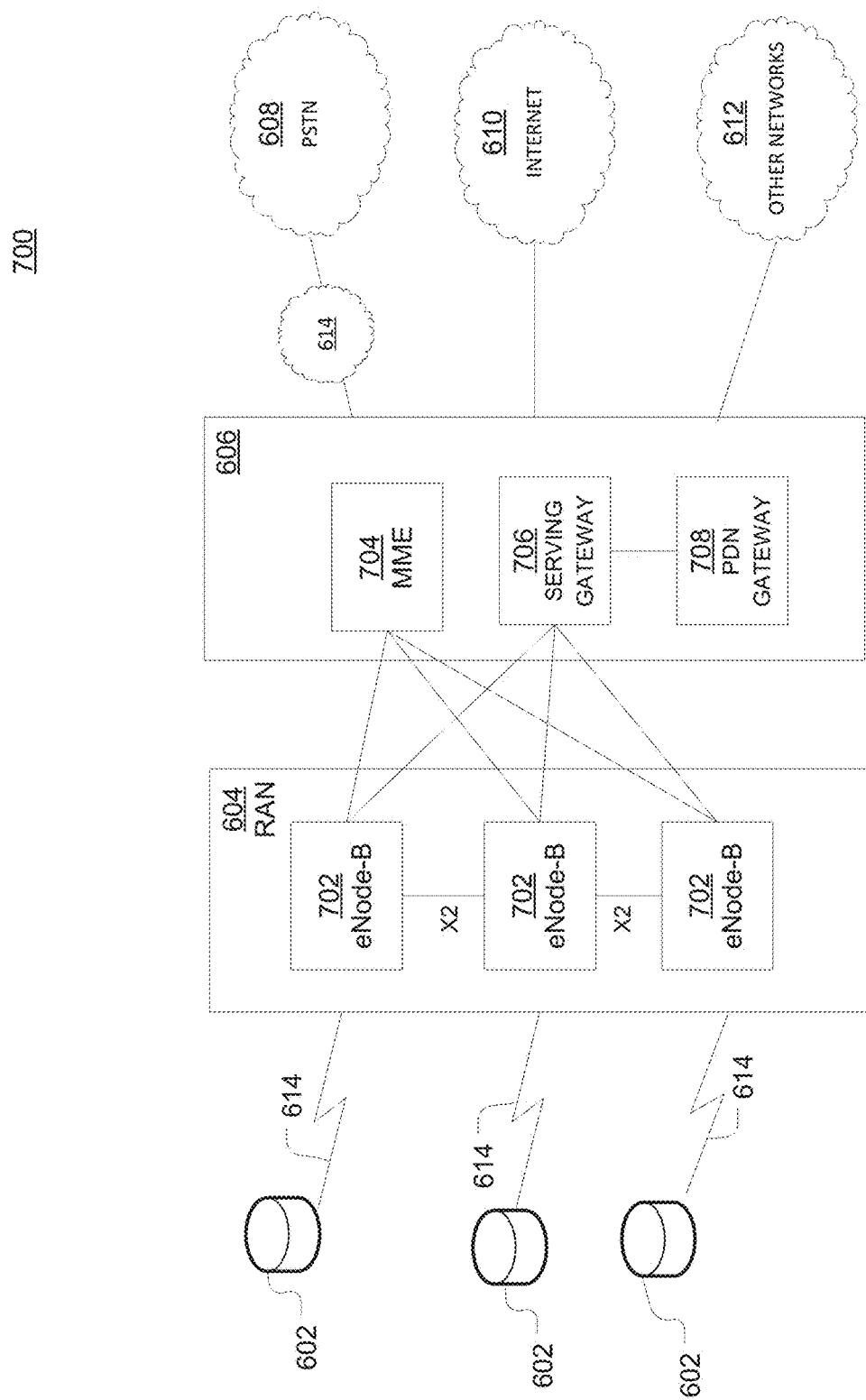
FIG. 10 is an example system diagram of a radio access network and a core network.

FIG. 10 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 10 eNode-Bs 702 may communicate with one another over an X2 interface.

Core network 606 shown in FIG. 10 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 11:
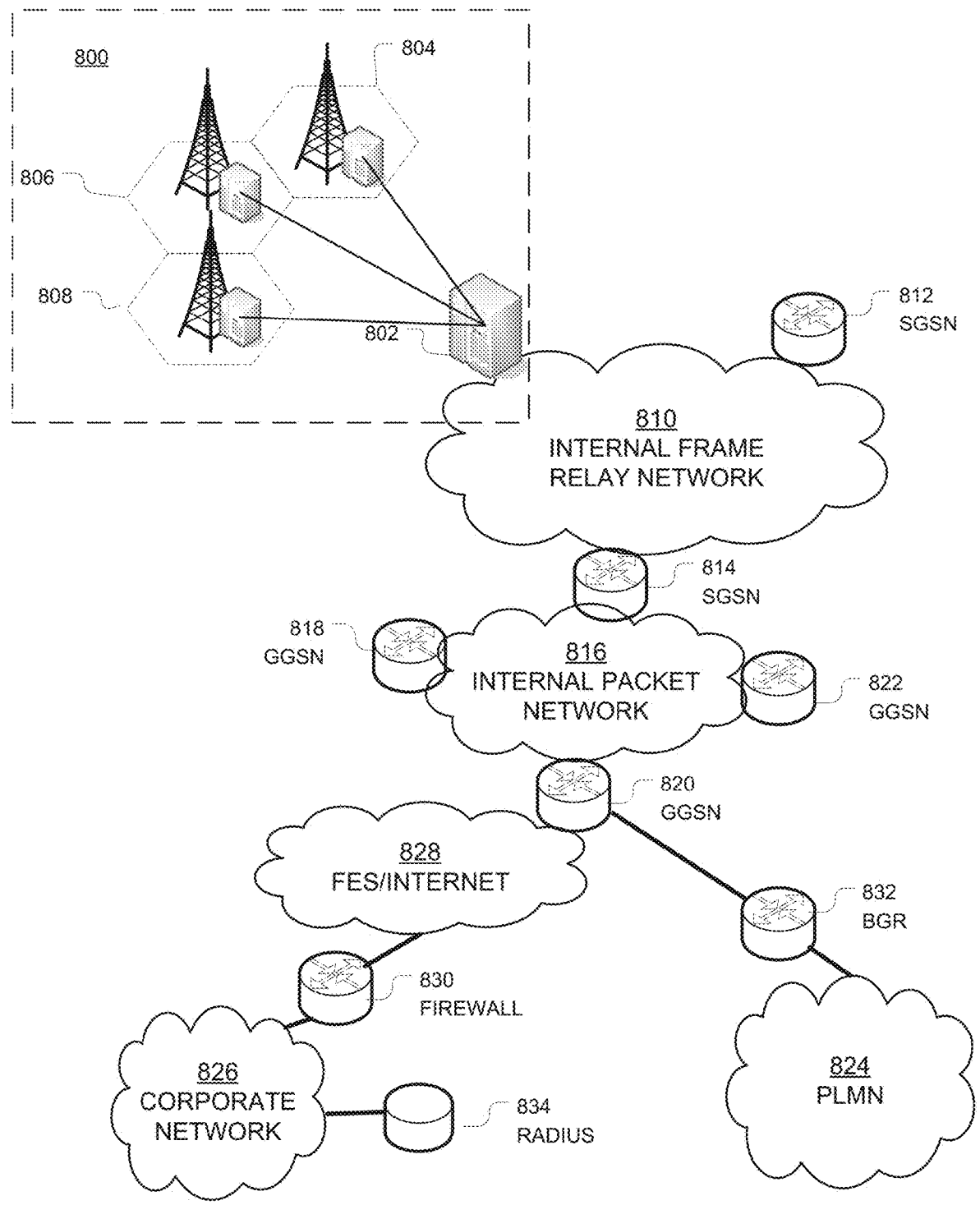
FIG. 11 depicts an overall block diagram of an example packet-based mobile cellular network environment, such as a general packet radio service (GPRS) network.

FIG. 11 depicts an overall block diagram of an example packet-based mobile cellular network environment, such as a GPRS network as described herein. In the example packet-based mobile cellular network environment shown in FIG. 11, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 12:
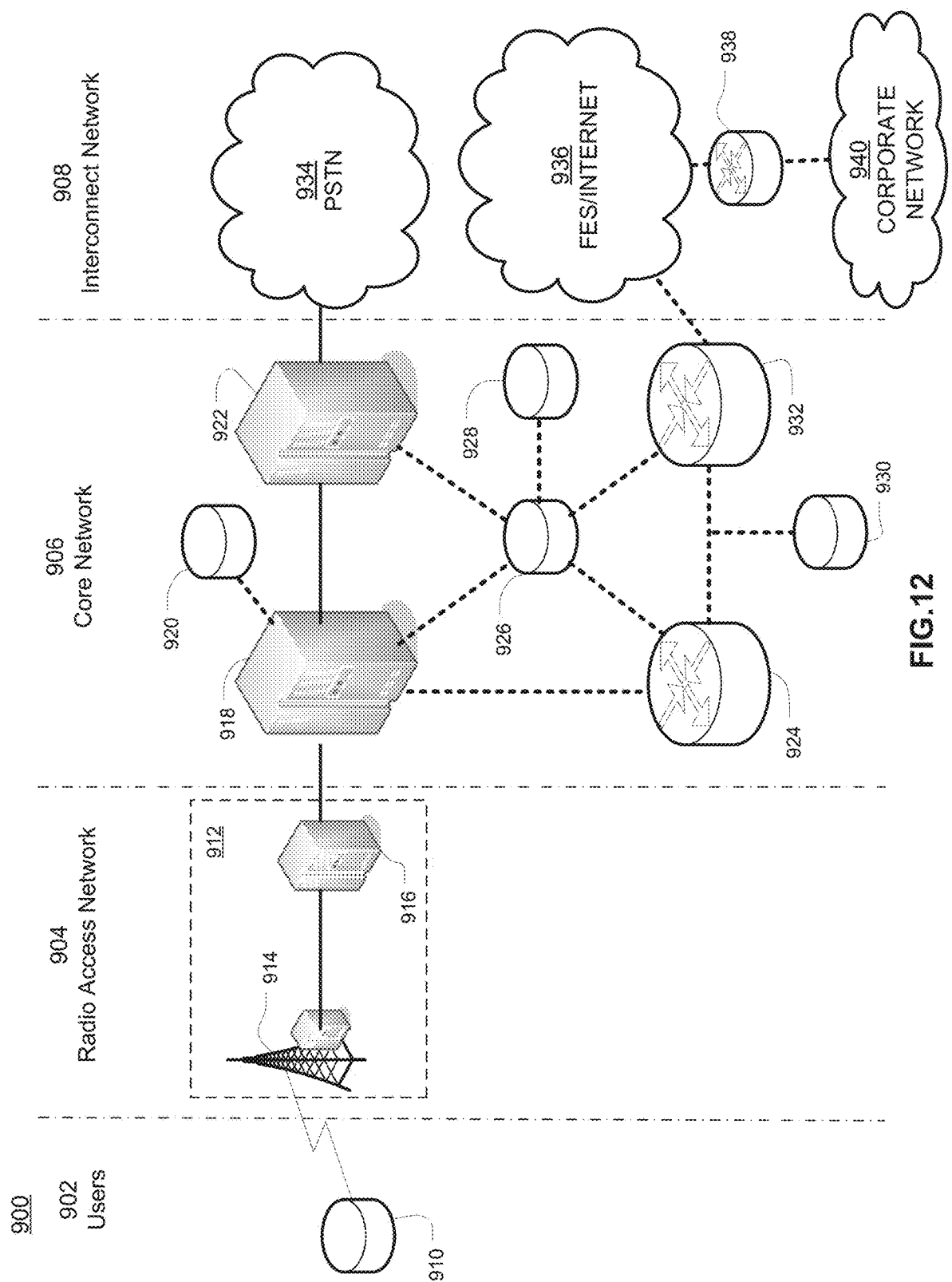
FIG. 12 illustrates an exemplary architecture of a GPRS network.

FIG. 12 illustrates an architecture of a typical GPRS network 900 as described herein. The architecture depicted in FIG. 12 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 12. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 12, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 10, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 12, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 13:
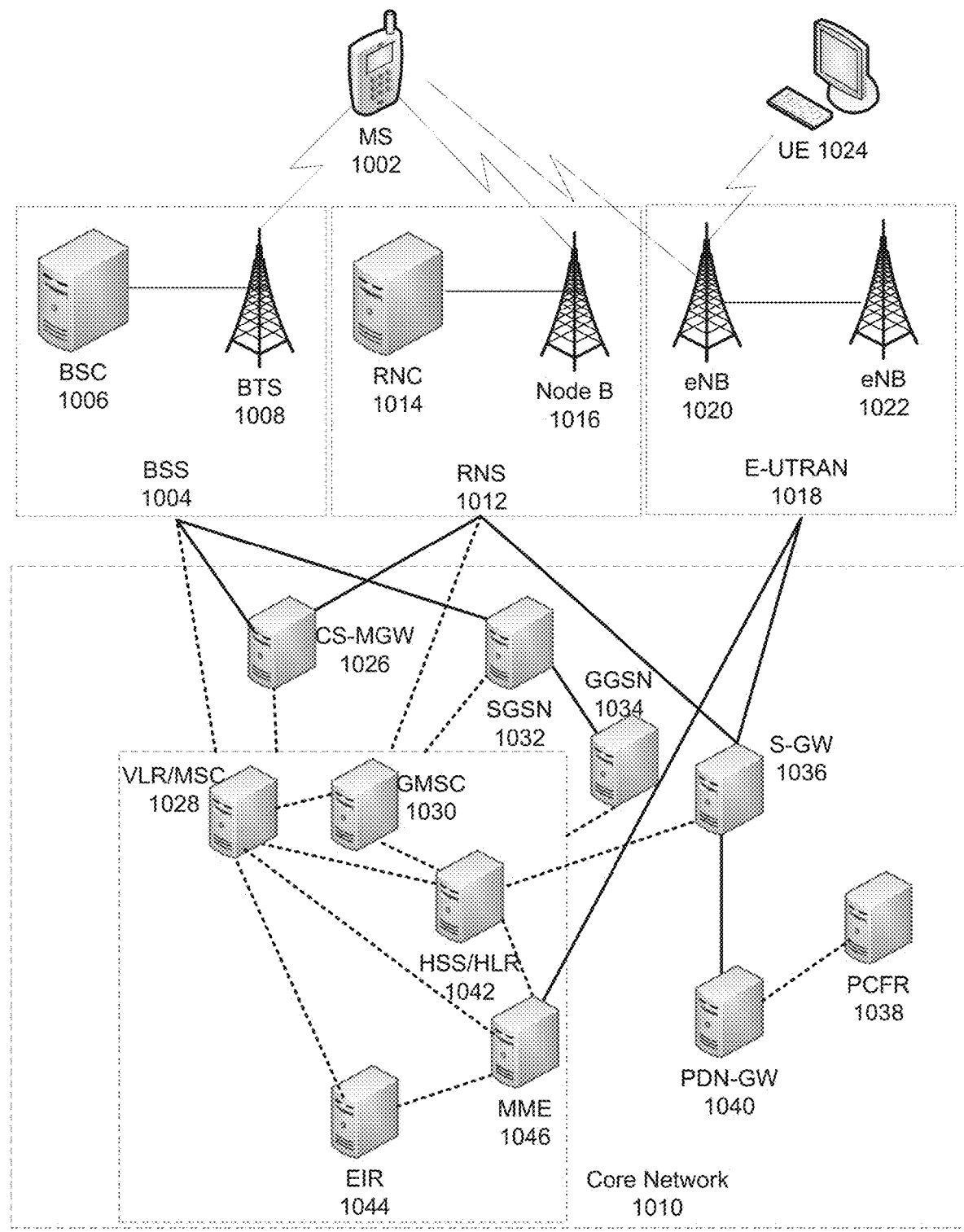
FIG. 13 is a block diagram of an exemplary public land mobile network (PLMN).

FIG. 13 illustrates a PLMN block diagram view of an example architecture that may be replaced by a telecommunications system. In FIG. 13, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency calls can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a traffic resource allocation system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A method for managing access to a transportation infrastructure comprising:
    receiving, by one or more processors, a request from a mobile device for a transportation reservation, wherein the mobile device is associated with a user;
    allocating, by the one or more processors, at least one resource to accommodate the reservation, wherein the at least one resource to accommodate the reservation comprises an autonomous vehicle;
    monitoring, by the one or more processors, a location of the mobile device requesting the reservation;
    based on the mobile device associated with the user, determining, by the one or more processors, there is a legal issue associated with the user, wherein the legal issue comprises a parking ticket;
    based on the legal issue, restricting, by the one or more processors, a travel destination of the autonomous vehicle to a home associated with the user or a location where the legal issue may be resolved; and
    directing, by the one or more processors, the autonomous vehicle to the home associated with the user or the location where the legal issue may be resolved.

2. The method of claim 1 further comprising a plurality of resources and the allocating step allocates at least one of the plurality of resources.

3. The method of claim 1 wherein the at least one resource is requested by the user and an alternative resource is suggested.

4. The method of claim 3 wherein the alternative resource is accepted and the reservation updated to include the alternative resource.

5. The method of claim 1 wherein the reservation is modified to include at least one new resource based on receiving an external input.

6. The method of claim 5 wherein the external input is related to one of an event, another transportation schedule, and the unavailability of the at least one resource.

7. The method of claim 1 further comprising generating a list of route options wherein one of the route options is a premium route option.

8. The method of claim 7 further comprising receipt of an acceptance of the premium route and assessing a charge for the premium route.

9. The method of claim 1 further comprising assessing a penalty for deviation from use of the at least one resource.

10. A device comprising:
    a processor; and
    a memory coupled with the processor, the memory having stored thereon executable instructions that when executed by the processor cause the processor to effectuate operations comprising:
        receiving a request from a mobile device for a transportation reservation, wherein the mobile device is associated with a user;
        allocating at least one resource to accommodate the reservation, wherein the at least one resource to accommodate the reservation comprises an autonomous vehicle;
        monitoring a location of the mobile device requesting the reservation;
        based on the monitoring of the location of the mobile device, determining that the at least one resource is being used;
        based on the mobile device associated with the user, determining there is a legal issue associated with the user;
        based on the legal issue, restricting a travel destination of the autonomous vehicle to a home associated with the user or a location where the legal issue may be resolved; and
        directing the autonomous vehicle to the home associated with the user or the location where the legal issue may be resolved.

11. The device of claim 10, further operations comprising a plurality of resources and the allocating step allocates at least one of the plurality of resources.

12. The device of claim 10, wherein the at least one resource is requested by the user and an alternative resource is suggested.

13. The device of claim 12, wherein the alternative resource is accepted and the reservation updated to include the alternative resource.

14. The device of claim 10, wherein the reservation is modified to include at least one new resource based on receiving an external input.

15. The device of claim 14, wherein the external input is related to one of an event, another transportation schedule, and the unavailability of the at least one resource.

16. The device of claim 10, further operations comprising generating a list of route options wherein one of the route options is a premium route option.

17. The device of claim 16, further operations comprising receipt of an acceptance of the premium route and assessing a charge for the premium route.

18. The device of claim 10, further operations comprising assessing a penalty for deviation from use of the at least one resource.

19. A system comprising:
    an autonomous vehicle; and
    a device communicatively connected with the autonomous vehicle, the device comprising:
        a processor; and
        a memory coupled with the processor, the memory having stored thereon executable instructions that when executed by the processor cause the processor to effectuate operations comprising:
            receiving a request from a mobile device for a transportation reservation, wherein the mobile device is associated with a user;

allocating at least one resource to accommodate the reservation, wherein the at least one resource to accommodate the reservation comprises the autonomous vehicle;

based on the mobile device associated with the user, determining there is a legal issue associated with the user;

based on the legal issue, restricting a travel destination of the autonomous vehicle to a home associated with the user or a location where the legal issue may be resolved; and directing the autonomous vehicle to the home associated with the user or the location where the legal issue may be resolved.

20. The system of claim 19, wherein the legal issue comprises house arrest or a restraining order.

\* \* \* \* \*